Jan. 8, 1935.　　　F. SKAUPY　　　1,987,220
METHOD AND APPARATUS FOR OPERATING INCANDESCENT BODIES
Filed July 30, 1932　　　3 Sheets-Sheet 1

Inventor:

Jan. 8, 1935.  F. SKAUPY  1,987,220
METHOD AND APPARATUS FOR OPERATING INCANDESCENT BODIES
Filed July 30, 1932   3 Sheets-Sheet 2
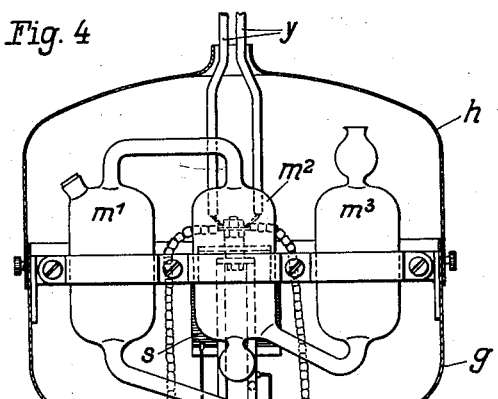
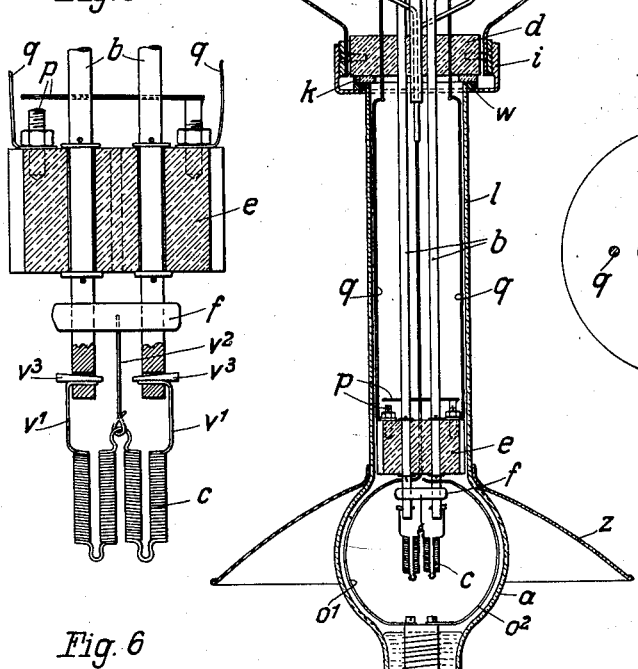
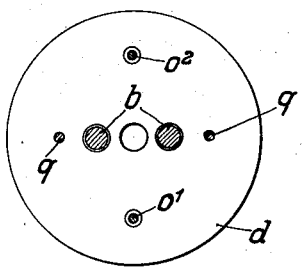
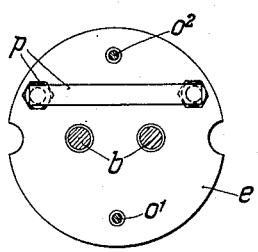
Inventor:
Franz Skaupy Jan. 8, 1935.  F. SKAUPY  1,987,220
METHOD AND APPARATUS FOR OPERATING INCANDESCENT BODIES
Filed July 30, 1932   3 Sheets-Sheet 3
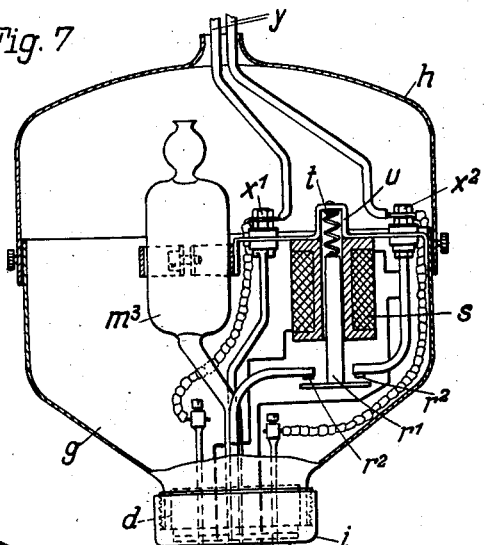
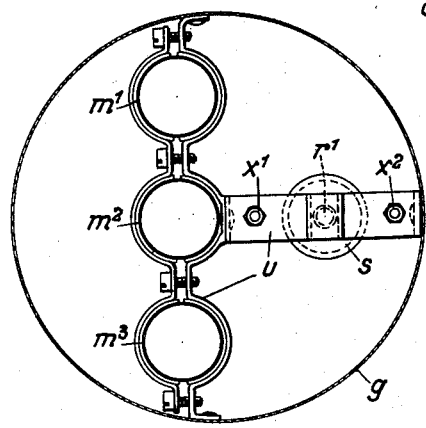
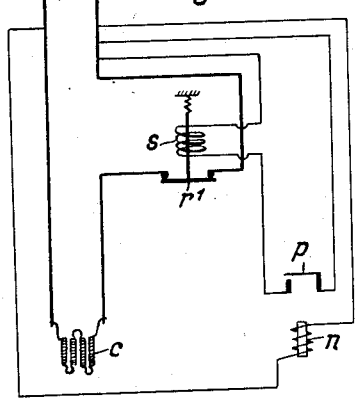
Inventor:

Patented Jan. 8, 1935

1,987,220

UNITED STATES PATENT OFFICE 1,987,220

METHOD AND APPARATUS FOR OPERATING INCANDESCENT BODIES

Franz Skaupy, Berlin-Lichterfelde, Germany

Application July 30, 1932, Serial No. 626,961
In Germany January 12, 1929

4 Claims. (Cl. 176—16)

This invention relates to the employment of mercury vapor as neutral filling in open high-candle power, electric incandescent lamps, chiefly for lighthouses and the like, and similar electric apparatuses, provided with easily exchangeable incandescent bodies and operated under atmospheric pressure. It is not possible with the known incandescent lamps with mercury vapor, to either exchange the incandescent bodies or to introduce through the glass bulb currents of a strength of any desired height.

These objections are, however, overcome by the apparatuses according to the invention. The incandescent part of the apparatus (illuminating bodies, heating element or glowing cathode) is situated in a vessel communicating with the atmosphere and which, according to the invention, is filled, when in operation, with mercury vapor in the portion surrounding the incandescent body. Thus the incandescent body can glow under atmospheric pressure and, nevertheless, only little loss by heat conductivity takes place, whereas at the same time, an oxidation and generally also every other chemical action on the incandescent body and the pulverization thereof are excluded. A small quantity of mercury is sufficient to permanently create the desired neutral atmosphere by evaporation, and moreover, as there is no vacuum tightly closed glass vessel, currents of any desired strength can easily be fed to the incandescent body. Moreover, the incandescent body can easily be exchanged. For example, incandescent lamps with enormous current strength and relatively low potential can be thus made for very high candle powers (carbon, tungsten, carbide of tantalum as illuminating bodies) which lamps can be employed for signals for maritime and air service, for example, in lighthouses, searchlights and the like, for exposing lamps in cinematographic ateliers and similar purposes. The glowing tubes of electric furnaces (for example carbon tubes, tungsten tube or tantalum carbide tube) can be heated to a very high temperature in the mercury vapor apparatuses according to the invention without the damaging of the heating body or of the charge. As the elimination of heat in the mercury vapor is very slight, it is only necessary for the purpose of economical heating, to further reduce the radiation losses, which may be effected by reflecting protecting sleeves. Glowing cathodes for rectifiers, for amplifiers and transmitter valves with three or more electrodes and similar apparatuses, can be operated in mercury vapor apparatuses according to the invention, seeing that it has been ascertained by experiments that space charge phenomena can be equally effective in dense gases as in the high vacuum.

Several embodiments of the invention are illustrated by way of example in the accompanying drawings in which.

Figure 3:
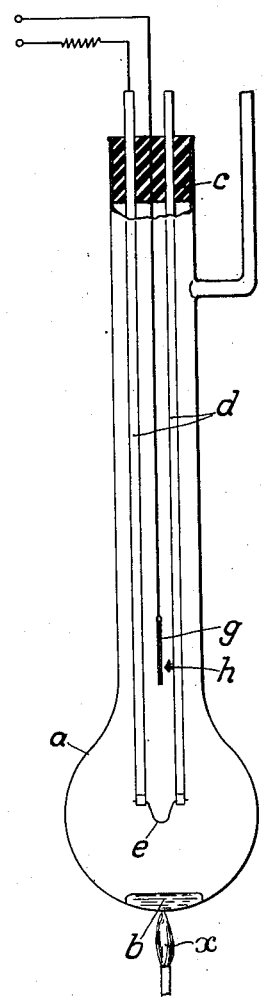

Fig. 3 likewise shows a third form of construction of the lamp.

Fig. 4 shows in longitudinal section a high candle power lamp with arrangement for vaporizing the mercury.

Fig. 5 is a part longitudinal section showing a detail of Fig. 4 on a larger scale.

Fig. 6 is a top plan view of Fig. 5.

Fig. 7 is a part longitudinal section taken at right angles to Fig. 4.

Fig. 8 is a top plan view of Fig. 7 with the cover removed.

Fig. 9 is a top plan view of the supporting plate.

Fig. 10 is a wiring diagram of the apparatus.

Figure 1:
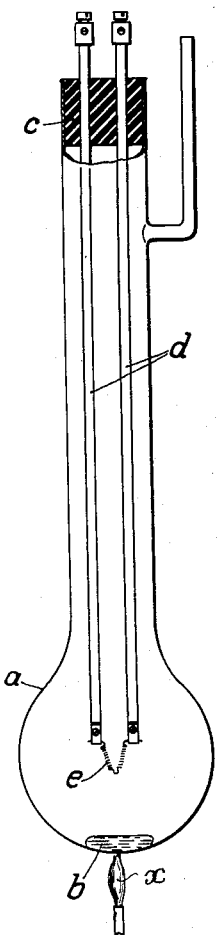
Fig. 1 shows an incandescent lamp in elevation, partly in section.
Figure 1A:
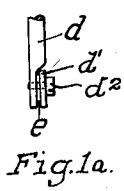
Fig. 1a is a side elevation of the end of one of the lead rods of Fig. 1 showing the means for detachably connecting the incandescent body thereto.
Figure 2:
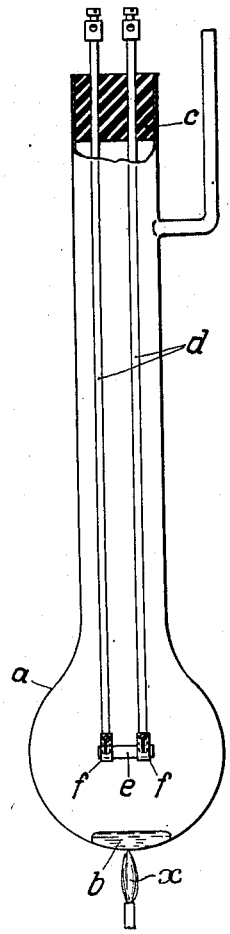
Fig. 2 is a similar view of a modified apparatus.
Figures 2A, 2B:
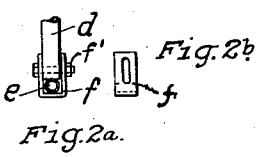
Fig. 2a is a side elevation of one of the lead rods of Fig. 2 showing the means for connecting the furnace tube thereto.
Fig. 2b is a front view of the connecting element.

In Fig. 1 a spiral incandescent body $e$ is securely yet easily exchangeably clamped to the lower end of two metallic rods $d$, by means of a plate $d'$ and screw $d^2$ and these rods serve at the same time as current leads and are held by an insulating plug $c$. This body is located in a glass bulb $a$ of heat resisting glass, which only allows slight heat radiation, in which bulb a portion of the mercury $b$ can be converted into vapor by heating for example by means of a flame $x$. As soon as the mercury vapor has displaced all air from the space surrounding the body $e$ current is supplied thereto through the rods $d$ connected to a source of current not shown in the drawings. Fig. 2 shows a similar apparatus and in which an electrically heatable furnace tube extends between the current lead rods $d$ and clamped thereon by means of straps $f$ and bolts $f'$. Fig. 3 differs from Fig. 1 substantially by a bi-metal band $g$ and a contact $h$ which serve for closing the circuit only when sufficient mercury vapor has developed. The vessel or bulb may be made of a material which readily absorbs or reflects the heat rays and can be closed by an element made of insulating material, which carries the incandescent body and its current leads and, if necessary, the switching in device responding under heat, that is, the bi-metal contact.

For protecting the mercury vapor against oxidation, the upper portion of the glass vessel may be flushed with a neutral gas or a small quantity of a neutral liquid evaporating more easily than the mercury, for example, water may be added to the mercury, which liquid first evaporates during the heating and supplies a steam layer inserted between the mercury vapor and the atmosphere.

In order to prevent the mercury from passing from the lamp bulb into the atmosphere and possibly causing poisoning, a mercury trap, such as wadding, glass wool, foil, granulated sulphur, is preferably placed in the connecting pipe between the interior of the bulb and the atmosphere. In order to prevent oxygen from penetrating into the interior of the vessel and causing an oxidation of the mercury an absorption device for oxygen, filled with phosporous rods or pumice stone saturated with sodium disulphite is, when necessary fitted in the above-mentioned connecting tube.

The mixing of the gas with the vaporized mercury by diffusion and convection, can be considerably reduced if directly above the portion of the vessel filled with pure mercury vapor an insert body is arranged which fills the cross sectional area of the vessel with the exception of a small space or channel. This insert body, preferably made of insulating material or, if made of metal, insulated from the current leads passing therethrough, is preferably carried by the current leads or carries the same. In the latter instance, it is fixed on the closing plug of the vessel.

Thermo resistant glasses, especially molten quartz glass, are suitable materials for the vessel containing the mercury vapor. In the case of molten quartz glass, the lower portion of the vessel can be made of transparent quartz glass and the upper portion of opaque quartz glass.

It is easily possible, in the case of lamps according to the invention, to accommodate a lens, for example, a quartz condenser lens, within the lamp and therefore in direct proximity to the incandescent body. When exchanging the incandescent body, it is then possible to also clean the lens from the blackening caused by pulverization.

Figs. 4 to 10 show in greater detail the construction of a high candle power lamp, according to the invention. In Fig. 4 $a$ designates the bulb open at the upper end and made, for example, of quartz glass and provided with a flange $w$. The bulb $a$ can be pressed air-tightly against an insulating body $d$ by means of a rubber ring $k$ and a screw thread connection $i$. The current leads, for example, strong metal rods (nickel) extending through the insulating element $d$, carry at their lower ends the incandescent body $c$, for example, a tungsten spiral. Lead wires $O_1$, $O_2$ extend through the insulating body $d$ to the heating element $n$ submerged in the mercury, and current leads $q$ extend to a bi-metal contact $p$, which is fixed on the insulating body $e$ filling the cross sectional area of the tube with the exception of two longitudinal slots. The inner space of the lamp bulb communicates with the atmosphere through a connecting tube extending through the insulating body $d$ and provided with several absorption vessels $m_1$, $m_2$, $m_3$. The absorption vessel $m_1$ serves for the complete absorbing of the mercury vapors tending to pass out of the vessel, $m_2$ contains a drying medium and $m_3$ an oxygen absorbing medium, which frees from oxygen the air entering the vessel. The absorption vessels and also the electric switch elements, which will be hereinafter described, are accommodated in a two-part fitting, the lower part $g$ of which carries the insulating body $d$ and also a support composed of clips for the absorption vessels and a band-shaped support $u$ connected therewith for the automatic current switch. The wiring diagram is shown in Fig. 10. The main circuit with the incandescent body $c$ is only switched in by a coil $s$ when this coil connected up in the bi-metal circuit receives current, owing to the closing of the bi-metal contact $p$ heated by the mercury vapor, and attracts the armature $r^1$ bringing same into contact with the contact $r_2$, $x_1$ and $x_2$ are the main terminals of the bridge support, to which the lead cables $y$ are connected which extend through the upper fitting part $h$ to the current consuming point. The end pieces $v$ of the incandescent body, which may be made of thick molybdenum wire, can, as shown in Fig. 5, be fixed in bores of the current conducting rods $b$ by wedge-shaped metal elements $v_3$. Holders $v_2$ inserted in an insulating element $f$ serve for carrying the insulating element. $z$ is a reflector.

I claim:

1. A high candle power incandescent electric lamp and similar electric apparatuses, provided with easily exchangeable incandescent bodies and operated under atmospheric pressure, comprising in combination a vessel in permanent communication with the atmosphere, liquid mercury in said vessel, electric leads extending into said vessel, an incandescent body connecting the lower ends of said leads, and heating means within said vessel for vaporizing said liquid mercury to expel the air from the lower portion thereof to allow said incandescent body to glow surrounded by mercury vapor.

2. A high candle power incandescent electric lamp and similar electric apparatuses, provided with easily exchangeable incandescent bodies and operated under atmospheric pressure, comprising in combination, a vessel communicating with the atmosphere, liquid mercury in said vessel, electric leads extending into said vessel, an incandescent body connecting the lower end of said leads, a contact device adjacent one of said leads including a bi-metal band adapted to make contact with its adjacent lead, and a circuit connected to the other of said leads and to said device to supply current to said body when closed by said device contacting with its adjacent lead.

3. A high candle power incandescent electric lamp and similar electric apparatuses, provided with easily exchangeable incandescent bodies and operated under atmospheric pressure, comprising in combination a vessel in permanent communication with the atmosphere, liquid mercury in said vessel, electric leads extending into said vessel, an incandescent body connecting the lower ends of said leads, heating means for maintaining the mercury in a vaporous state under normal conditions, an element inserted in the upper end of said vessel and carrying said leads, said element adapted to be removed from said vessel with said leads to render accessible said incandescent body.

4. A high candle power incandescent electric lamp and similar electric apparatus provided with easily exchangeable incandescent bodies and operated under atmospheric pressure, comprising in combination, a vessel in permanent communication with the atmosphere, liquid mercury in said vessel, electric leads extending into said vessel, an incandescent body connecting the lower ends of said leads, and heating means exteriorly of said vessel for vaporizing said liquid mercury to expel the air from the lower portion thereof to allow said incandescent body to glow surrounded by mercury vapor.

FRANZ SKAUPY.